(12) United States Patent
Ballard

(10) Patent No.: US 9,826,128 B1
(45) Date of Patent: Nov. 21, 2017

(54) VIDEO MONITORING DEVICE

(71) Applicant: Steven J. Ballard, San Antonio, TX (US)

(72) Inventor: Steven J. Ballard, San Antonio, TX (US)

(*) Notice: Subject to any disclaimer, the term of this patent is extended or adjusted under 35 U.S.C. 154(b) by 0 days.

(21) Appl. No.: 15/074,762

(22) Filed: Mar. 18, 2016

Related U.S. Application Data

(63) Continuation-in-part of application No. 29/556,671, filed on Mar. 2, 2016.

(51) Int. Cl.
*H04N 5/232* (2006.01)
*H04N 5/225* (2006.01)

(52) U.S. Cl.
CPC ................................. *H04N 5/2251* (2013.01)

(58) Field of Classification Search
CPC ............. G08G 1/04; G08G 3/00; H04N 7/188
See application file for complete search history.

(56) References Cited

U.S. PATENT DOCUMENTS

| | | | | |
|---|---|---|---|---|
| 7,236,200 B2* | 6/2007 | Vernon | ................ | H04N 5/2256 348/370 |
| 7,710,452 B1* | 5/2010 | Lindberg | ............... | H04N 7/188 348/149 |
| 7,852,211 B2* | 12/2010 | Gunn | ............... | G08B 13/19602 340/541 |
| 2002/0176712 A1* | 11/2002 | Brown | ............ | G08B 13/19623 396/427 |

* cited by examiner

*Primary Examiner* — Trung Diep
(74) *Attorney, Agent, or Firm* — Gunn, Lee & Cave, PC

(57) ABSTRACT

The present disclosure relates to a video monitoring device with one or more video cameras mounted to a pole that extends from a concrete base. The concrete base rests on a ground surface at a monitored site rather than being cast into the site as a permanent fixture. The surface of the concrete base that rests on the ground surface has one or more indentions that extend though a sidewall, which allows a forklift's forks to be positioned under the concrete base without moving the base. A housing mounted to the pole for the placement of electronic components is also disclosed, as well as electric components for the device when 120 Volt AC power is available at a monitored site. Further, specialized brackets to facilitate mounting the housing to the pole are also disclosed.

21 Claims, 11 Drawing Sheets

VIDEO MONITORING DEVICE

CROSS REFERENCE TO RELATED APPLICATIONS

This original nonprovisional application is a continuation-in-part of U.S. Design patent application No. 29/556,671, filed Mar. 2, 2016, which is incorporated by reference.

STATEMENT REGARDING FEDERALLY SPONSORED RESEARCH OR DEVELOPMENT

Not applicable

BACKGROUND OF THE INVENTION

1. Technical Field

The present invention relates generally to video monitoring systems for security monitoring of sites and, more particularly, to a video monitoring device having a pole mounted to a pre-cast concrete base that is not permanently affixed to the site.

2. Description of the Related Art

Video monitoring devices are used in the security industry to visually observe sites so they remain secure against intrusion. For example, security companies may be engaged to operate the video monitoring device, observe the site, and notify law enforcement if an intruder enters the site. These security companies—which do not own the site and do not run the business located at the site—are responsible for ensuring that the video monitoring devices located at the site operate correctly. In many instances, the security company monitors the site outside normal business hours, when the business at the site is closed.

At a minimum, a video monitoring device includes at least one video camera, but may include additional items depending on the complexity the device. The video camera transmits images from the site to a display that is typically separate from the camera. Images from the camera may be transmitted through a hardwired communication link or a wireless communication link (e.g., radio communication, wireless network, etc.) between the video monitoring device and the display. The display may be physically present at the monitored site or may be at a monitoring station located remote from the site.

The video cameras at a monitored site are usually installed in an elevated location, which allows site observation from a high vantage point and prevents intruders from tampering with the camera. Permanent fixtures on the site (e.g., buildings, perimeter walls, poles cemented into the ground, etc.) may provide a suitable location to affix the cameras; however, in many instances the unavailability of site fixtures at the proper location within the site prohibits ideal camera positioning. For example, cameras are often required at or near the perimeter of the site but there aren't any fixtures there. In such a case, a permanent fixture could be installed at the site perimeter (e.g., as a pole cemented into the ground), but site owners may not desire that type of permanent alteration to their site, especially when the monitored site is a business that leases its premises from the site owner.

If a suitable fixture is not present and permanently installing a fixture is not an option, security companies can install the camera on a pole that extends from a base, but these types of temporary video monitoring devices are generally less secure than those affixed to permanent fixtures. In this regard, the base rests on a ground surface at the site and the temporary video monitoring device can usually be moved or pushed over with relative ease, thereby compromising the security personnel's ability to monitor the site. For example, an intruder could enter the site during normal business hours when the video monitoring device is not active and the intruder could move, push over, or even take the device at that time. In fact, temporary video monitoring devices installed on construction sites, oil drilling sites, or other sites where a good deal of traffic comes into and out of the site during normal business hours—when the device is turned off—are particularly susceptible to this type of tampering.

Additionally, when security personnel activate the temporary video monitoring device and it has been moved or pushed over, the personnel may not be able to quickly determine why it is not working properly. For example, a security company's personnel may be at a monitoring station hundreds or even thousands of miles away from the site and there may not be anybody at the site to investigate the cause of the problem, especially if the monitoring occurs only after normal business hours or for sites that are not normally occupied by humans. As a result, these offsite security personnel must choose between calling the police in the jurisdiction where the site is located to investigate the cause of the problem or leaving the site unsecure during the time required for the security personnel to travel to the site.

Including a very heavy base as part of the temporary video monitoring device could remedy the problem, but doing so creates logistical problems for installation because the base must weigh at least several hundred pounds. Accordingly, heavy equipment (e.g., a forklift, crane, front loader, etc.) is required to position the base at the proper location on the site, but moving the video monitoring device with this type of heavy equipment risks damage unless the device is specifically designed so the heavy equipment can maneuver it into position.

Additionally, temporary video monitoring devices should be designed for quick installation, especially when installed by a security company hired to monitor a business operating at the site and minimal business interruption becomes important. Thus, it is desirable to assemble offsite as much of the temporary video monitoring device as possible and to facilitate the on-site assembly of any components that must be assembled at the site. Doing so not only minimizes business interruption for the security company's customer, it also minimizes the number of security-company personnel required to complete assembly at the site.

Therefore, there is a need for a temporary video monitoring device with a base that is heavy enough to prevent the video monitoring device from being easily moved or tipped over and that is properly designed to be handled by heavy equipment. Further, there is a need for a temporary video monitoring device that is designed to be quickly installed, with minimal assembly at the site.

BRIEF SUMMARY OF THE INVENTION

The video monitoring device disclosed herein addresses the aforementioned problems. It has one or more video cameras mounted to a pole that extends from a concrete base. The concrete base is precast prior to arriving at the site and rests on the ground surface at the site, rather than being cast into the site as a permanent fixture.

The concrete base has a first side and a second side opposite the first side, with the first side generally facing upward and the second side generally facing downward. The first side has a first surface with a plate mounted thereto, and the pole extends generally upward from the plate. The second side has a second surface designed to rest on a ground surface at the site. Preferably, the second surface spans across the entire second side and has at least one indention that extends through a sidewall of the concrete base. The at least one indention enables a forklift's forks to be positioned under the concrete base without moving the base. Preferably, there are two substantially parallel indentions in the second surface that extend through the sidewall, with the indentions sized and spaced apart from each other so that a tine from the fork of a standard forklift can enter into them while the second surface is resting on the ground surface.

Further, the video monitoring device may include specialized brackets to facilitate the mounting of the housing to the pole. When present, the brackets comprise a first bracket affixed to the pole and a second bracket affixed to the housing. The first bracket has a lip that protrudes outwardly from the pole in a generally upward direction and the second bracket has a socket to receive the lip. During assembly, the socket is lowered onto the lip until it rests on the lip. Preferably, the socket is at an end of a vertical crosspiece that extends above the housing, and the crosspiece has a hole between the housing and the socket. A bolt or screw can be inserted through the hole and into the pole to further secure the housing on the pole.

DETAILED DESCRIPTION OF THE INVENTION

Figure 1:
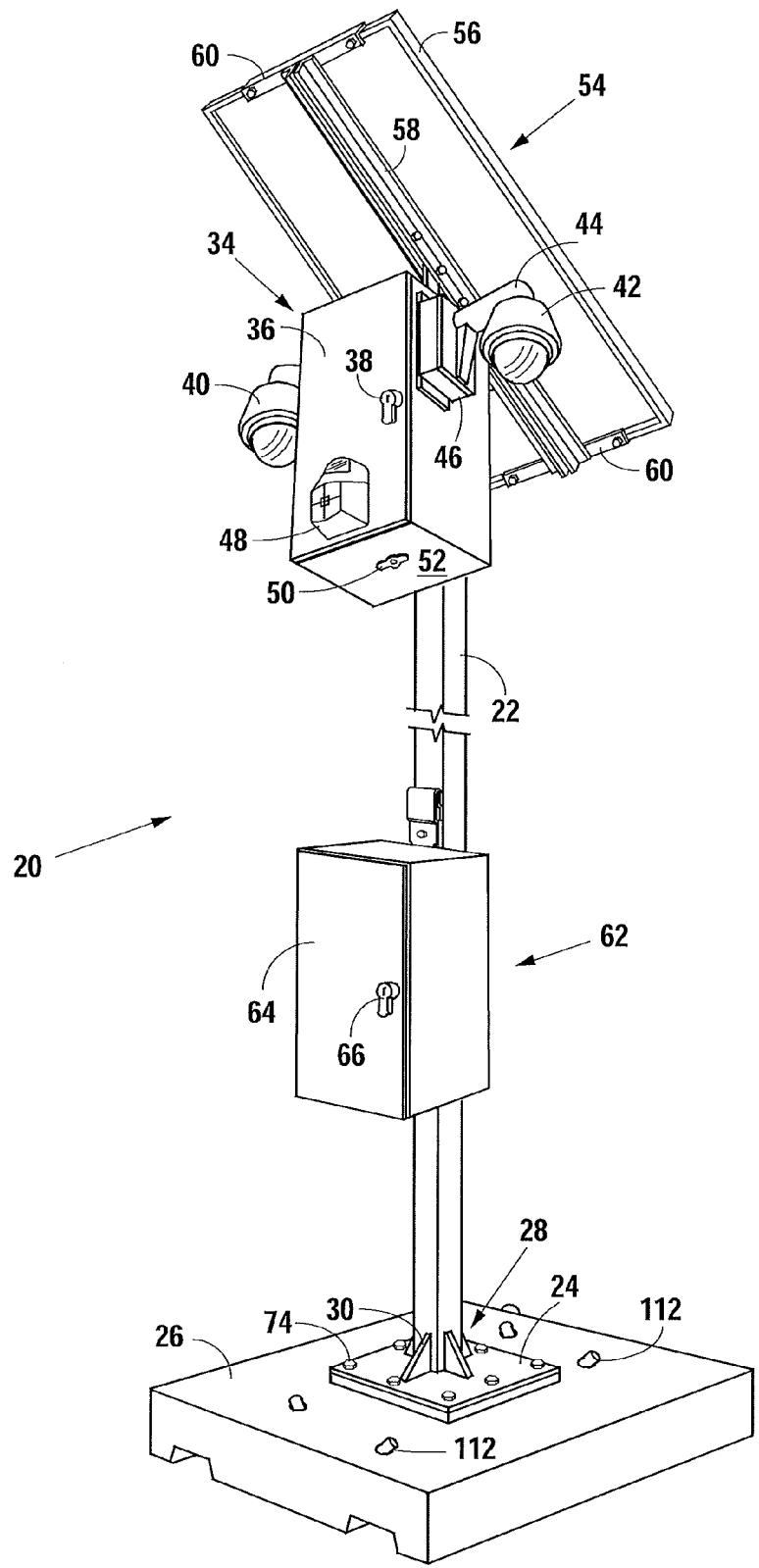
FIG. 1 is a perspective view showing the preferred embodiment of the present invention configured to be operated with solar power.

A video monitoring device 20 is shown in FIG. 1. It includes a pole 22 extending from a plate 24 that is mounted to a concrete base 26. The pole 22 has a first end 28 that is preferably welded or otherwise affixed to the plate 24, with one or more ribs 30 extending between the pole 22 and the plate 24 for stability. Alternatively, the plate 24 may have a socket (not shown) for the first end 28 of the pole 22 to rest within or the first end 28 may bolted to the plate 24. The pole 22 extends in a generally upward direction from the plate 24 and terminates in a second end 32 (see FIG. 2) opposite its first end 28.

A first housing 34 may be mounted to the pole 22, preferably on the upper half of the pole 22 near the second end 32. The first housing 34 has a door 36 that allows access to an interior cavity within the first housing 34. The door 36 is mounted on hinges (not shown), which may be recessed within the door 36 as shown in Applicant's U.S. Design patent application No. 29/556,671, which is hereby incorporated by reference. The door 36 has a latch 38 that may contain a keyed lock. In its preferred form, the first housing 34 is shaped as a rectangular box that is twenty-four inches tall, twelve inches wide, and ten inches deep (outside dimensions) with its longest dimension vertically oriented, but the first housing 34 could be any number of shapes and sizes.

In the illustrated embodiment a first video camera 40 is mounted to one side of the first housing 34 and a second video camera 42 is mounted to an opposite side of the first housing 34. In alternative embodiments, additional video cameras may be present (e.g., a video camera mounted to the door 36), less video cameras may be present (e.g., a single video camera mounted to one side of the first housing 34), or the video cameras may not be mounted to the first housing 34 (e.g., if the video cameras were mounted directly to the pole 22).

The video cameras 40, 42 may be mounted to the first housing 34 in a variety of ways. In the illustrated embodiment, for example, the first video camera 40 is shown mounted to an arm 44 that extends from a junction box 46 bolted to the side of the first housing 34. The type of mounting configuration is available from Hangzhou Hikvision Digital Technology Company, Ltd. as a product with Model No. "WML" under the Hikvision® trademark. However, Applicant has added a seal in the seams between the arm 44 and the junction box 46 in the WML product and added a seal to the seams between the junction box 46 and the first housing 34 to promote water resistance.

Other components of the video monitoring device 20 that may be mounted to the first housing 34 include an audible alarm 48 and a light 50. In the illustrated embodiment, for example, the audible alarm 48 is a product known as SSX-52SB offered by Potter Electric Signal Co., LLC mounted to the door 36, but the audible alarm 48 may be mounted elsewhere on the first housing 34 or may not be mounted on the first housing 34 at all. The light 50 is preferably a blue LED mounted to a bottom surface 52 of the first housing 34 that emits a light beam focused in the downward direction. Such a light 50 is available as product number EFL1W0B under the SoundOff Signal® trademark owned by Emergency Technology, Inc., but other types of lights may be used. Further, the light 50 may be mounted elsewhere on the first housing 34 or elsewhere on the video monitoring device 20 (e.g., on the pole 22).

A solar panel 54 may also be mounted to the second end 32 of the pole 22. The solar panel 54 has a frame 56 with two cross-members 58 extending across the length of the frame 56 and two cross-members 60 extending across the width of the frame 56 at its edges. When present, the solar panel 54 accumulates solar power during daylight hours and transmits the power from the solar panel 54 to batteries (not shown) within a second housing 62 mounted to the pole 22. Similar to the first housing 34, the second housing 62 has a door 64 with a latch 66 for access into an interior cavity.

Figure 2:
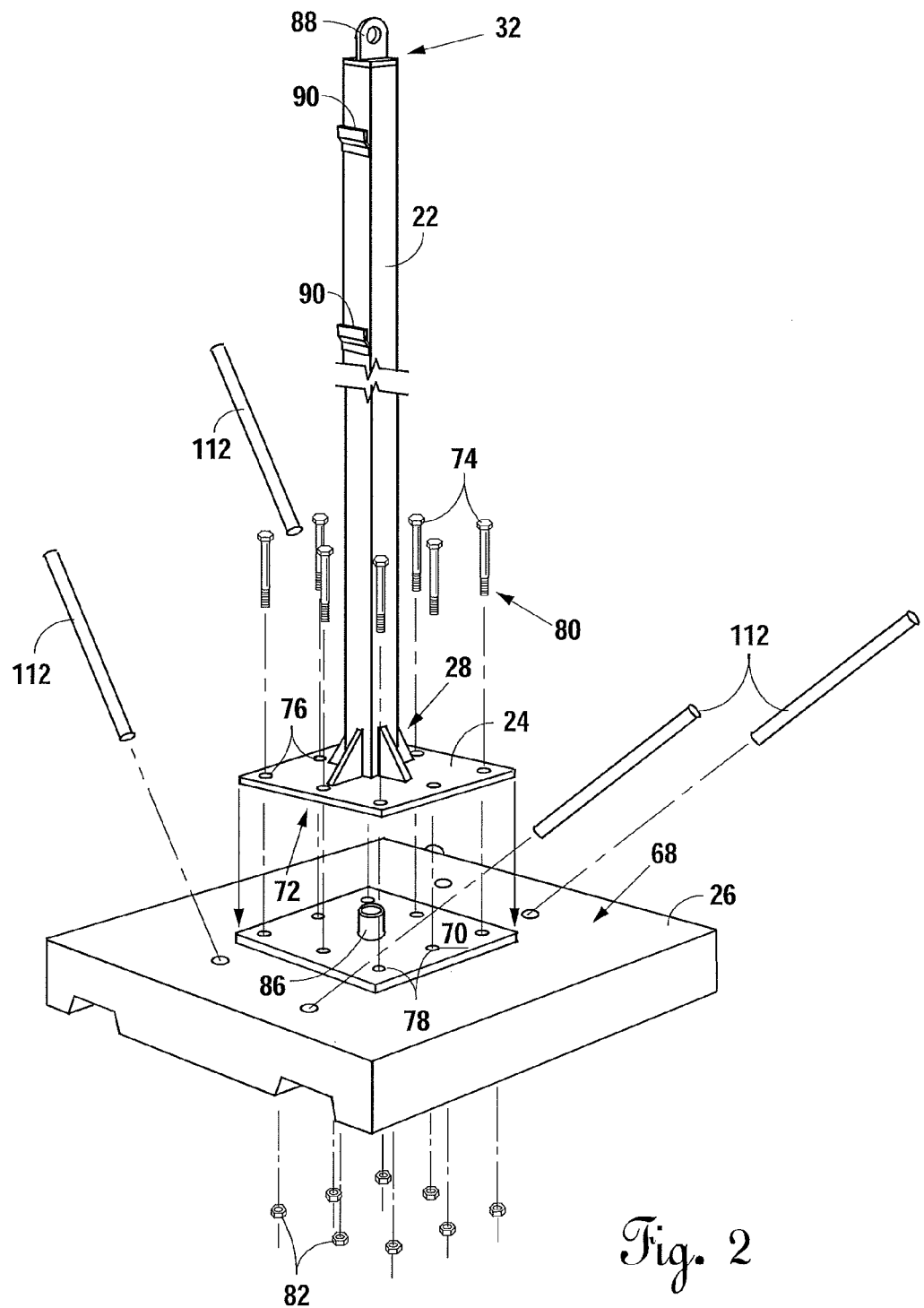
FIG. 2 is an exploded perspective illustrating how the plate is mounted to the first side of the concrete base in the preferred embodiment, with arrows showing the plate moving toward the base.

In FIG. 2, the plate 24 is shown exploded from the concrete base 26. The concrete base 26 has a first side 68 that generally faces upward, and the first side 68 has a first surface 70 where the plate 24 is mounted. Preferably, the first surface 70 is contoured to match the contour of a bottom surface 72 of the plate 24, thereby allowing the bottom surface 72 to rest in direct contact with the first surface 70 without any gaps between the two surfaces. For example, the bottom surface 72 of the plate 24 and the first surface 70 may both be generally flat. Alternatively, the contours of the first surface 70 may not match the contours of the bottom surface 72 of the plate 24 and the bottom surface 72 may not directly contact the first surface 70 (e.g., if spacers were present between the two surfaces).

In the preferred embodiment the first surface 70 is elevated approximately three-fourths of an inch from the remainder of the first side 68. The remainder of the first side 68 is generally flat but could be contoured differently (e.g., curved, pointed, undulating, etc.) in alternative embodiments. Similarly, the first surface 70 may be flush with the remainder of the first side 68 such as, for example, if the entire first side 68 was flat.

One or more bolts 74 may affix the plate 24 to the concrete base 26. When the bolts 74 are present, the plate 24 has bolt holes 76 through it that align with corresponding bolt holes 78 though the concrete base 26. The bolts 74 are placed through the aligned holes, and each of the bolts 74 has a proximal end 80 protruding through the concrete base 26 where a nut 82 is threaded. It should be noted, however, that the plate 24 may be mounted to the concrete base 26 in an alternative manner. For example, the plate 24 could be affixed within the concrete base 26 when the base 26 is cast, or cross-members (not shown) affixed to the concrete base 26 could extend over the plate 24.

In the preferred embodiment, the plate 24 is three-eighths inch thick steel and is in the shape of a square with eighteen inch sides. Although not shown in FIG. 2, the center of the plate 24 may have a hole through it. The hole is intended to align with a conduit 84 (see FIG. 3) that extends from within the concrete base 26 through the first surface 70. In this regard, a first portion 86 of the conduit 84 protrudes from the first surface 70 and may be inserted through the hole in the plate 24. The hole in the plate 24 opens into a cavity within pole 22 that extends from the first end 28 of the pole 22 to the second end 32 of the pole 22. The cavity within the pole 22 allows a concealed space to run wires or other cabling between various components of the video monitoring device 20.

FIG. 2 also shows an eyelet 88 that may be located at the second end of the pole 22 for mounting the solar panel 54 to the pole 22, as well as two brackets 90 affixed to the pole 22 for mounting the first housing 34 to the pole 22. Although not shown, similar brackets 90 may be present to mount the second housing 62 to the pole 22.

Figure 3:
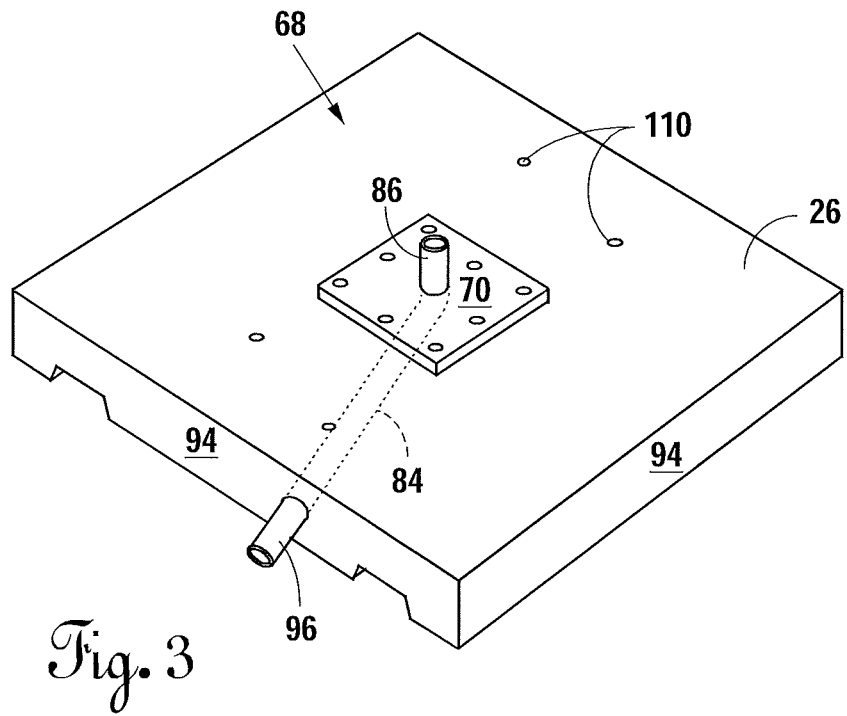
FIG. 3 is a top perspective view of the concrete base showing the first side of the base and a conduit which may extend through the base.
Figure 4:
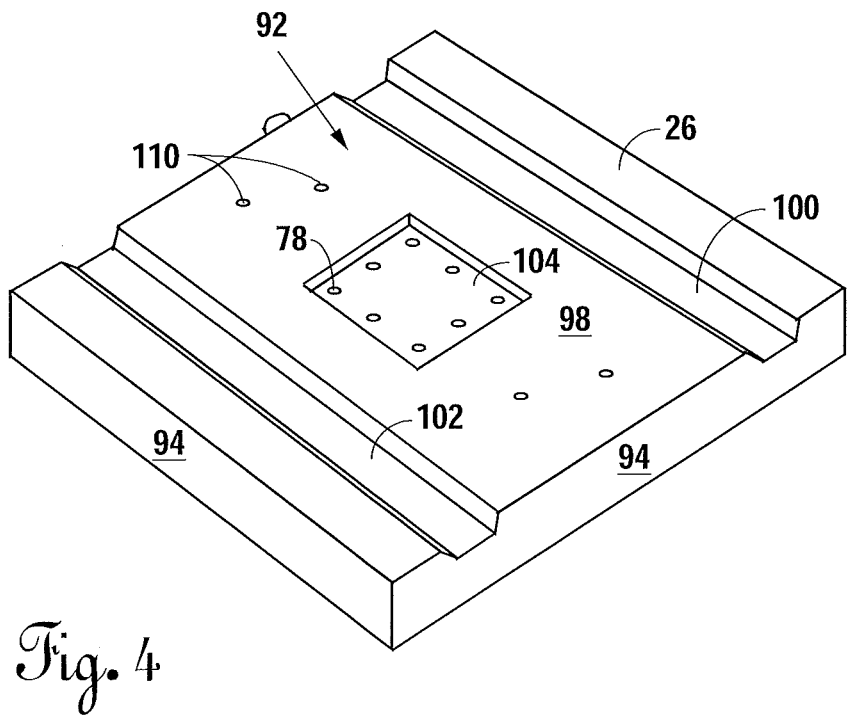
FIG. 4 is a bottom perspective view of the concrete base showing the second side of the base and indentions that may be present in the second surface of the second side.

FIG. 3 shows the first side 68 of the concrete base 26 and FIG. 4 shows a second side 92 of the concrete base 26, along with sidewalls 94 that extend between the first side 68 and the second side 92. In the preferred embodiment, the concrete base 26 is generally shaped as a square and there are four sidewalls 94 which are all substantially the same length and height. However, the concrete base 26 may be shaped differently, with more or less sidewalls 94 between its first side 68 and its second side 92. Further, the sidewalls 94 are generally flat in the preferred embodiment but may be contoured differently (e.g., curved, pointed, undulating, etc.) in alternative embodiments.

In FIG. 3, the conduit 84 is shown extending within the concrete base 26, from the first surface 70 to one of the sidewalls 94. The conduit 84 extends through the first surface 70 and the first portion 86 is available for entry into the cavity within the pole 22, as previously described. A second portion 96 of the conduit 84 protrudes from one of the sidewalls 94 and allows access for cables or other wiring to be run from outside the concrete base 26 into the cavity within the pole 22.

In FIG. 4, the second side 92 has a second surface 98 that is designed to rest in direct contact with a ground surface at the monitored site. The second surface 98 in the illustrated embodiment extends across the entire second side 92 of the concrete base 26, but may not in alternative embodiments. Additionally, the second surface 98 is substantially flat but may be contoured differently (e.g., curved, pointed, undulating, etc.) in alternative embodiments to match the contours of the ground surface.

A first indention 100, a second indention 102, and a third indention 104 are preferably within the second surface 98. The first indention 100 and second indention 102 each extend through at least one of the sidewalls 94, and in the illustrated embodiment they each extend through two sidewalls 94. Both indentions 100, 102 extend across the second surface 98 in a substantially straight line, and the indentions 100, 102 are substantially parallel to each other. Both indentions 100, 102 are also preferably sized so that a standard tine from a forklift (not shown) fits therein.

Figure 5:
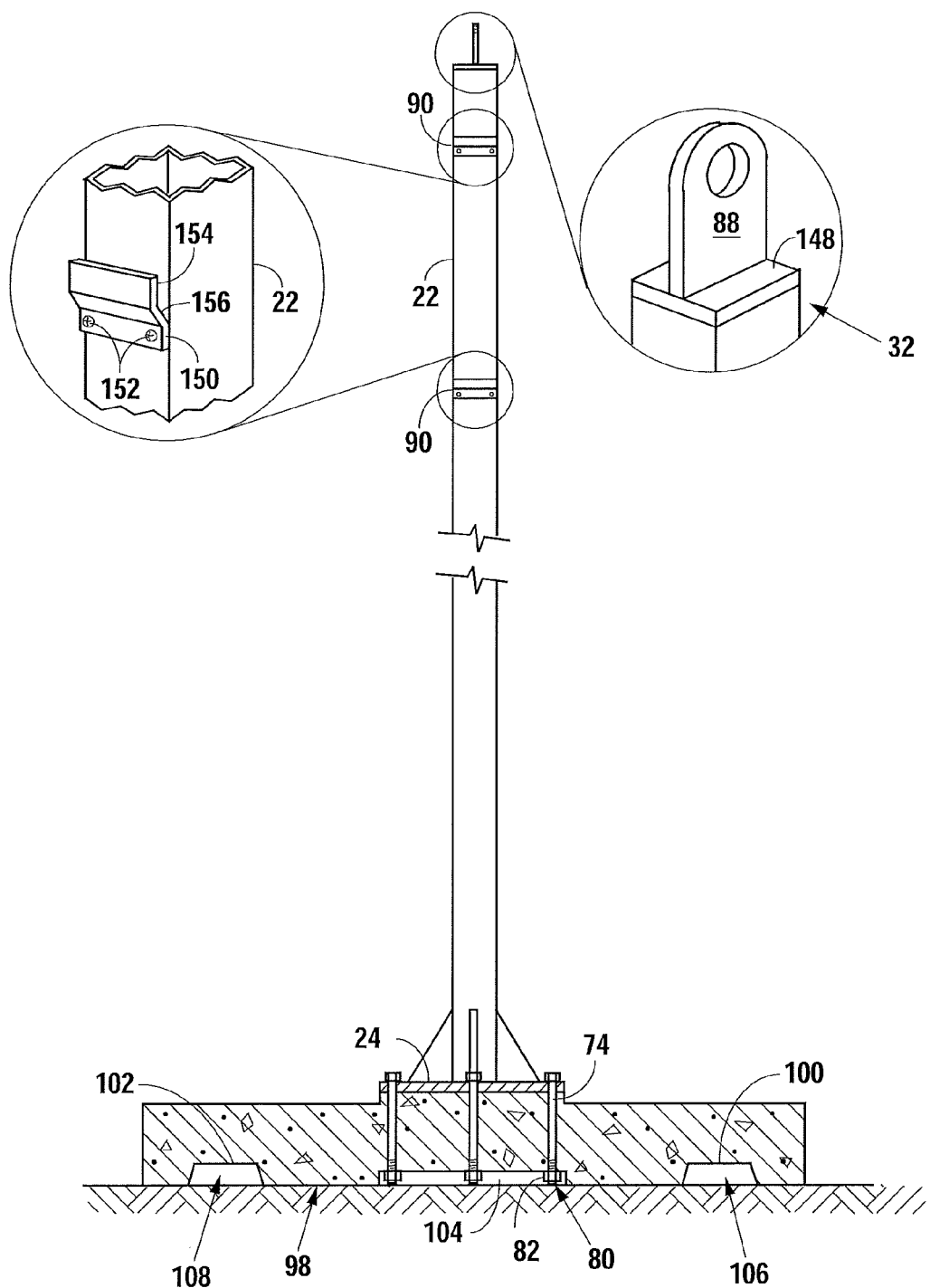
FIG. 5 is a cross section of the concrete base that illustrates a third indention in the base which may be present to accommodate bolts extending through the base and illustrates an eyelet and brackets which may be present on the pole.

The third indention 104 contains the bolt holes 78 that extend through the concrete base 26 and provides a space for the proximal end 80 of the bolts 74 and the corresponding nut 82 thereon (see FIG. 5). The third indention 104 is preferably in the shape of a square that has the same side dimensions as the plate 24, making it eighteen inches long on each side in the preferred embodiment. Additionally, a three-quarter inch depth for the third indention 104 should provide sufficient space for the proximal end 80 of the bolts 74 and the corresponding nut 82.

A space 106 created by the first indention 100 and a space 108 created by the second indention 102 are shown in FIG. 5 from a side view. The spaces 106, 108 allow the tines of a forklift to be positioned under the concrete base 26 while the second surface 98 rests in direct contact with the ground surface at the site. As a result, positioning the video monitoring device 20 during installation is facilitated because the tines of the forklift can be removed from the spaces 106, 108 without moving the concrete base 26. It should also be noted that a similar effect could be created by having a single large indention (not shown) that receives both tines of the forklift.

Referring back to FIGS. 3-4, one or more grounding holes 110 through the concrete base 26 are present in the preferred embodiment. The grounding holes 110 extend from the first side 68 to the second side 92 at an angle and are offset from each other so they do not extend through the concrete base 26 along the same plane.

The grounding holes 110 allow grounding rods 112 to be driven through the concrete base 26 and into the ground surface at the monitored site as shown in FIGS. 1-2, and the offset grounding holes 110 prevent the grounding rods 112 from contacting each other below the ground surface at the monitored site. When installed, the grounding rods 112 help the video monitoring device 20 resist high wind loads. For example, wind load tests reveal that the video monitoring device 20 can withstand wind speeds greater than ninety miles per hour when copper grounding rods 112 are used, with each rod being five-eighths inches in diameter and four feet long. However, the video monitoring device 20 can still be removed from the monitored site after the grounding rods 112 are installed by lifting the video monitoring device 20 with a forklift, which pulls the rods out of the ground surface (and bends the grounding rods in the process).

Figure 6:
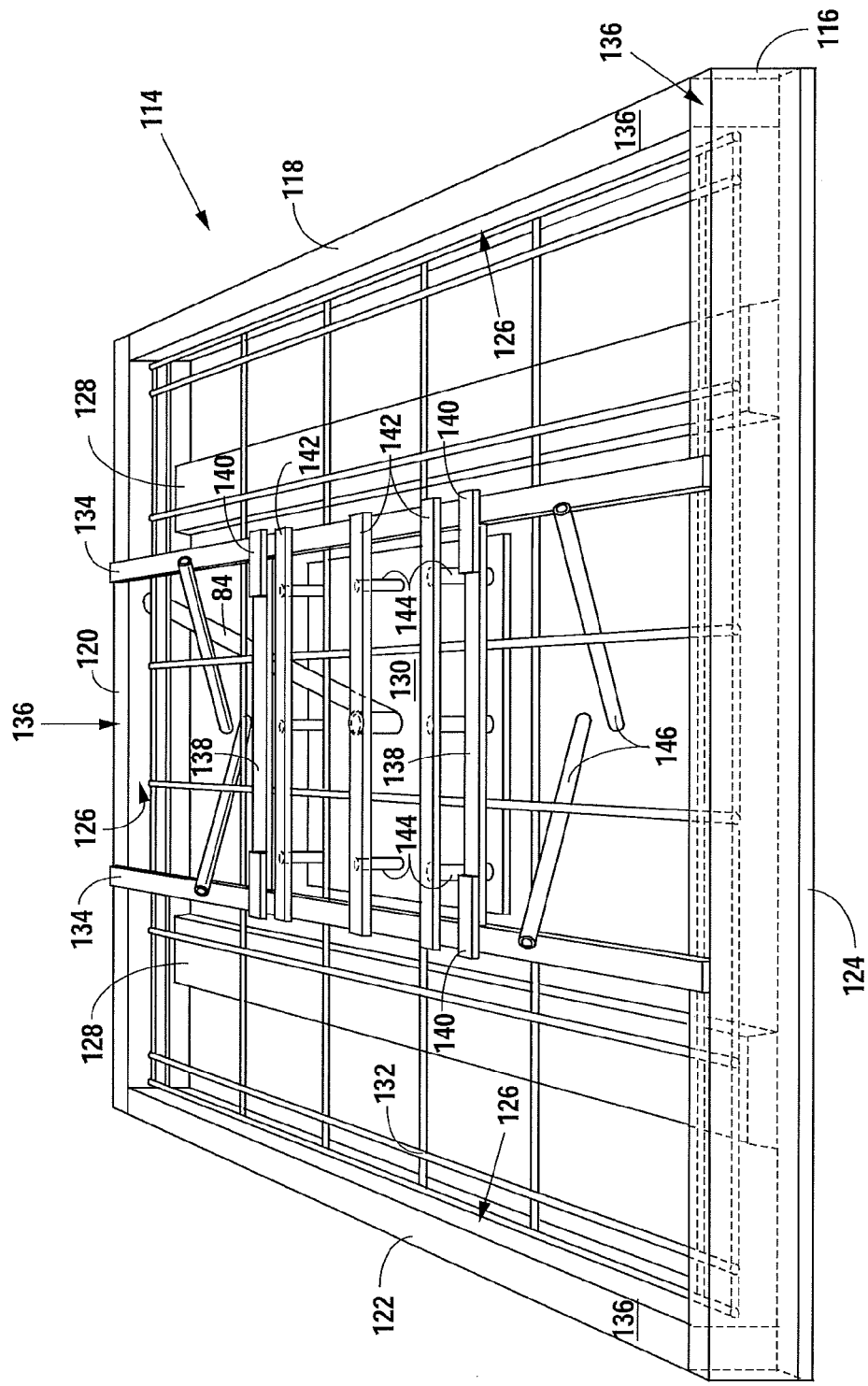
FIG. 6 is a top perspective view showing a preferred form to cast the concrete base.

FIG. 6 illustrates an example of a form 114 that may be used to cast the preferred concrete base 26. The form 114 has four perimeter pieces 116, 118, 120, 122 affixed to each other with removable fasteners (not shown) and placed on a platform 124. Each of the perimeter pieces 116, 118, 120, 122 has an inside surface 126 and, together, the inside surfaces 126 form a square with four foot long sides. The perimeter pieces 116, 118, 120, 122 are preferably standard 2"×6" wood boards and the platform 124 may be plywood.

To form the first and second indentions 100, 102 in the second surface 98, two lower lateral pieces 128 extend from the inside surface 126 of one perimeter piece 116 to the inside surface 126 of the opposite perimeter piece 120. The lower lateral pieces 128 rest on the platform 124 and preferably are positioned parallel to each other, approximately twenty-two inches apart from each other. They are affixed to the perimeter pieces 116, 120 with removable fasteners (not shown) that extend through the perimeter pieces 116, 120 into the ends of the lower lateral pieces 128. Preferably, each of the lower lateral pieces 128 is approximately four feet long and has a trapezoidal cross-section approximately six inches wide at its widest base, four inches wide at its narrowest base, and three inches tall. The lower lateral pieces 128 may be formed, for example, by stacking two standard 2"×6" wood boards on top of each other and cutting the two boards to the proper size.

Also resting on the platform 124 is a third piece 130 to form the third indention 104 in the second surface 98. The third piece 130 is positioned with its center at the center of the square formed by the inside surface 126 of the four perimeter pieces 116, 118, 120, 122. It is preferably an eighteen inch by eighteen inch square that is three-quarters of an inch tall, and three-quarter inch plywood may be used.

A lattice 132 of reinforcing material rests on the two lower lateral pieces 128. The lattice 132 helps strengthen the concrete base 26 and also adds weight. For example, three-eighths inch or even half inch steel rebar may be used for the lattice 132, with wire (not shown) holding the pieces of rebar together.

Two upper lateral pieces 134 extend across the form 114, from a top surface 136 of one perimeter piece 116 to the top surface 136 of the opposite perimeter piece 120. The upper lateral pieces 134 are affixed to the respective top surfaces 136 with removable fasteners (not shown).

Two crosspieces 138 extend between the two upper lateral pieces 134 and are perpendicular thereto. Connecting pieces 140 are affixed to the two upper lateral pieces 134 and the two crosspieces 138 with fasteners (not shown), which prevents the two crosspieces 138 from falling toward the platform 124.

The two upper lateral pieces 134 and the two crosspieces 138 are in the same plane and, together, form a square that is approximately the same size as the third piece 130 on the platform 124. The square formed by the two upper lateral pieces 134 and the two crosspieces 138 is also preferably at the center of the square formed by the inside surface 126 of the four perimeter pieces 116, 118, 120, 122, again like the third piece 130. Further, the two upper lateral pieces 134 and the two crosspieces 138 are preferably at least three-quarters of an inch thick, and standard 1"×2" wood boards may be used.

Three upper crosspieces 142 rest on top of the upper lateral pieces 134 and extend generally perpendicular thereto. The upper crosspieces 142 are held in place with wire (not shown) wrapped around the upper lateral pieces 134 and the upper crosspieces 142. Bolt-hole pins 144 suspended from the three upper crosspieces 142 have one end affixed (e.g., glued) to the respective upper crosspiece and another end resting on the third piece 130. The length of each bolt-hole pin 144 is at least as great as the width of the four perimeter pieces 116, 118, 120, 122 and the diameter of each bolt-hole pin 144 should be at least equal to or slightly greater than the diameter of the bolts 74 that affix the plate 24 to the concrete base 26. For example, one-half inch schedule 40 PVC pipe can be used for the bolt-hole pins 144 to create bolt holes 74 for three-eighths inch bolts. Additionally, the conduit 84 is positioned with one end abutting one of the upper crosspieces 142 and the other end extending out of a hole (not shown) in the perimeter piece 120. For example, three-quarter inch schedule 40 PVC electrical conduit may be used.

One or more grounding conduits 146 are suspended from the upper lateral pieces 134, with one end resting on the platform 124 and the other end next to the upper lateral piece from which it is suspended. Each of the grounding conduits 146 extends from one of the upper lateral pieces 134 toward the platform 124 at an angle, and wire (not shown) wrapped around each of the grounding conduits 146 and the upper lateral piece from which the conduit is suspended holds each of the grounding conduits 146 in place. The end of each of the grounding conduits 146 that rests on the platform 124 is cut at an angle so it is flush against the platform 124, thereby preventing concrete from entering into that end when the concrete is poured.

To create the concrete base 26, concrete (not shown) is poured into the form 114 until it is substantially flush with the top surface 136 of the perimeter pieces 116, 118, 120, 122. Then, additional concrete is poured into the square formed by the two upper lateral pieces 134 and the two crosspieces 138 until that additional concrete is substantially flush with the top of those pieces. The concrete should be viscous enough so that the additional concrete does not cause the concrete in the remainder of the form 114 to spill over the top surface 136 of the perimeter pieces 116, 118, 120, 122. Measures should also be taken to ensure that the concrete is compacted and air pockets are removed from the poured concrete (e.g., by a vibrating concrete poker), and the exposed concrete should be troweled smooth once properly compacted.

After the concrete has cured for a suitable amount of time the wire (not shown) holding the three upper crosspieces 142 in place on the upper lateral pieces 134 is removed and the three upper crosspieces 142 are pulled away from the form 114. As such, the bolt-hole pins 144 affixed to the upper crosspieces 142 are pulled out of the concrete, and the concrete should be cured enough so that the void left by the removed bolt-hole pins 144 does not collapse. The amount of time required before the bolt-hole pins 144 may be removed depends on a variety of factors (e.g., humidity, temperature, & type of concrete), but generally the bolt-hole pins 144 can be removed one to three hours after 3000 PSI concrete is poured. Additionally, the bolt holes 76 may be drilled through the concrete base 26 if bolt-hole pins 144 are not utilized.

The grounding conduits 146, on the other hand, remain within the concrete after it has fully cured. The grounding rods 112 (see FIG. 2) are driven through the grounding conduits 146 and a lubricant (not shown) may be applied to the interior of the grounding conduits 146 to facilitate the maneuver.

The type of concrete used for the concrete base 26 is a design choice provided that the chosen concrete can withstand the transport and placement of the video monitoring device 20 at the monitored site. For example, general purpose concrete rated at 3000 PSI is durable enough for standard applications and provides a concrete base 26 that weighs approximately 1160 pounds.

The form 114 can be removed after the concrete is fully cured. The removable fasteners (not shown) between the two upper lateral pieces 134 and the top surface 136 of the perimeter pieces 116, 120 are removed, along with the wire (not shown) around the grounding conduits 146. The upper lateral pieces 134 are then pulled away from the perimeter pieces 116, 120, which also removes the two crosspieces 138. Next, the removable fasteners (not shown) affixing the perimeter pieces 116, 118, 120, 122 to each other and affixing the perimeter pieces 116, 120 to the lower lateral pieces 128 are removed, allowing the perimeter pieces 116, 118, 120, 122 to be broken away from the concrete base 26. Finally, the concrete base 26 is lifted on its side and the platform 124, the lower lateral pieces 128, and the third piece 130 are broken away.

Referring back to FIG. 5, the eyelet 88 extends from an endcap 148 affixed to the second end 32 of the pole 22. Alternatively, the eyelet 88 may be in direct contact with the pole 22 and affixed to the pole 22 without the endcap 148. When present, the endcap 148 may be closed or may have an opening (not shown) into the cavity within the pole 22.

FIG. 5 also shows each of the brackets 90 has a portion 150 that is in direct contact with and affixed to the pole 22. The portion 150 may contain one or more holes (not shown) to receive a screw, bolt, or other fastener 152 that affixes the brackets 90 to the pole 22, or the portion 150 may be affixed to the pole 22 in some other manner (e.g., welded). Each of the brackets 90 also has a lip 154 that protrudes outwardly from the pole 22 due to a bend 156 between the lip 154 and the portion 150. Preferably, each of the brackets 90 has a profile generally shaped like a "Z," but may have a different profile in alternative embodiments. It should be noted less than two brackets 90, or even no brackets 90, may be present, depending on how the first housing 34 (or the second housing 62) is mounted to the pole 22.

Figure 7:
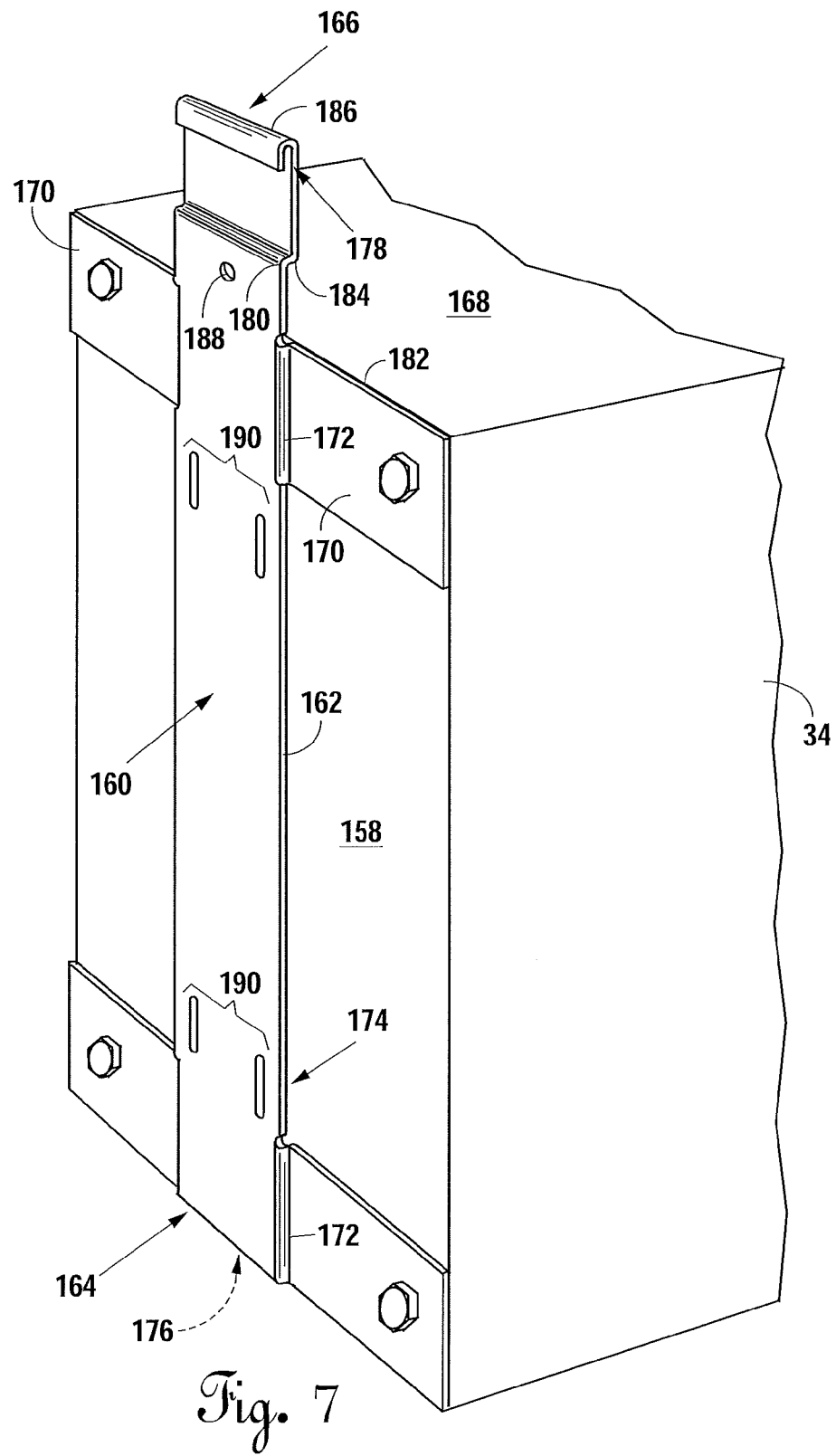
FIG. 7 is a rear perspective view of the housing mounted to the pole in the preferred embodiment and illustrates the preferred bracket affixed to the rear of the housing.

FIG. 7 shows a rear surface 158 of the first housing 34 with a bracket 160 affixed to the rear surface 158. The bracket 160 has a vertical crosspiece 162 with a first end 164 near the bottom surface 52 (see FIG. 1) of the first housing 34 and a second end 166 past a top surface 168 of the first housing 34. One or more lateral crosspieces 170 bolted to the rear surface 158 are connected to the vertical crosspiece 162 through a bend 172 that extends away from the rear surface 158. The bend 172 causes the vertical crosspiece 162 to be elevated off the rear surface 158, thereby creating a gap 174 between the rear surface 158 and the vertical crosspiece 162. The gap 174 forms a socket 176 at the first end 164 of the vertical crosspiece 162, between the vertical crosspiece 162 and rear surface 158.

The second end 166 of the vertical crosspiece 162 has a socket 178 formed through bends in the vertical crosspiece 162. A first bend 180 directs the vertical crosspiece 162 past an edge 182 that is formed between the rear surface 158 and the top surface 168 of the first housing 34. Once past the edge 182, a second bend 184 directs the vertical crosspiece 162 away from the top surface 168 in a generally vertical direction. A third bend 186 that is generally shaped like a "U" directs the vertical crosspiece 162 back over the first bend 180, thereby forming the socket 178 at the second end 166.

Various holes may also be present in the vertical crosspiece 162. For example, a hole 188 is preferably drilled or otherwise formed through the vertical crosspiece 162 between the edge 182 and the first bend 180. Additionally, one or more pairs of holes 190 through the vertical crosspiece 162 may be present to accommodate straps (not shown) for mounting the first housing 34 to the pole 22.

The bracket 160 may be made using commonly known manufacturing techniques such as by cutting a sheet of metal (not shown) using a CNC router and bending the bracket 160 into its preferred form. Alternatively, the bracket 160 may be cut using other known cutting techniques (e.g., water-jet cutting, laser cutting, etc.) and bent or welded into the proper form, or it may be stamped from a sheet of metal (not shown) and bent into the required form. Preferably, the bracket 160 is made from eleven gauge steel and may be heated to achieve the bends; however, a different thickness steel or alternative metal may be utilized.

Figure 8:
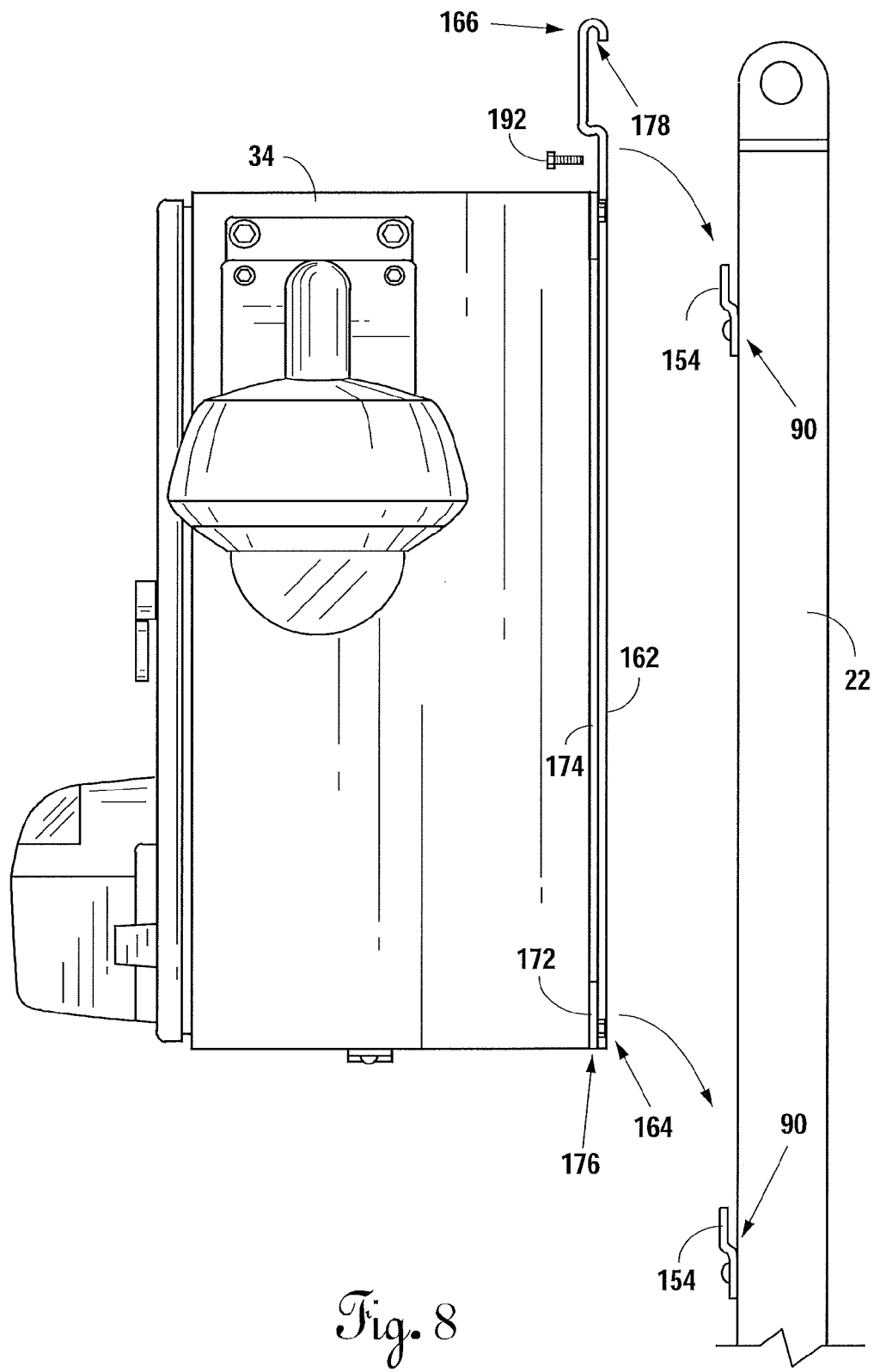
FIG. 8 is a side view illustrating the housing being mounted to the pole in the preferred embodiment, with arrows showing a bracket on the housing being lowered onto brackets on the pole.
Figure 8A:
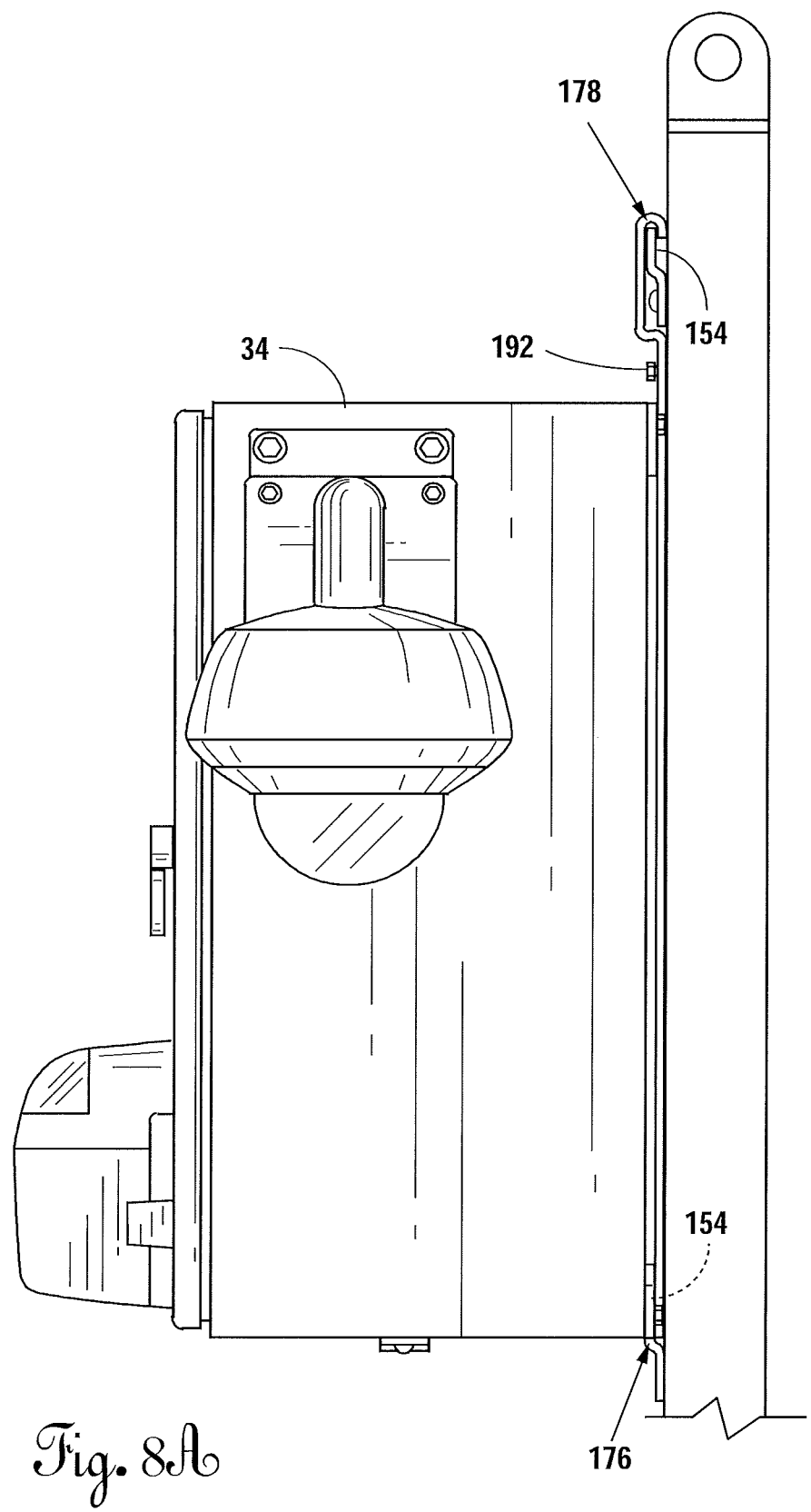
FIG. 8A is a side view of the preferred housing mounted to the pole.

To mount the first housing 34 on the pole 22 in the illustrated embodiment, the bracket 160 on the rear surface 158 of the first housing 34 is placed on the brackets 90 that are affixed to the pole 22. In this regard, the socket 176 at the first end 164 of the vertical crosspiece 162 is lowered onto the lip 154 of one of the brackets 90, and the socket 178 at the second end 166 of the vertical crosspiece 162 is lowered onto the lip 154 of the other, as shown in FIG. 8. In FIG. 8A, the first housing 34 is held in place on the pole 22 once the sockets 176, 178 each receive their respective lip 154, and a screw, bolt, or other fastener 192 may be inserted through the holes 188 and into the pole 22 to further secure the bracket 160 to the pole 22.

Preferably, each of the brackets 90 is equal to or slightly less than the width of the corresponding socket 176, 178 that receives it. The brackets 90 may be manufactured by extruding a length of material (not shown) and cutting the length to the proper width, or through other manufacturing processes. Preferably, the brackets 90 are made from aluminum so they are lightweight and corrosion resistant, but other materials may be used. Further, it should be noted that the foregoing discussion concerning how the first housing 34 may be mounted to the pole 22 applies equally to how the second housing 62 (see FIG. 1) may be mounted to the pole 22.

Figure 9:
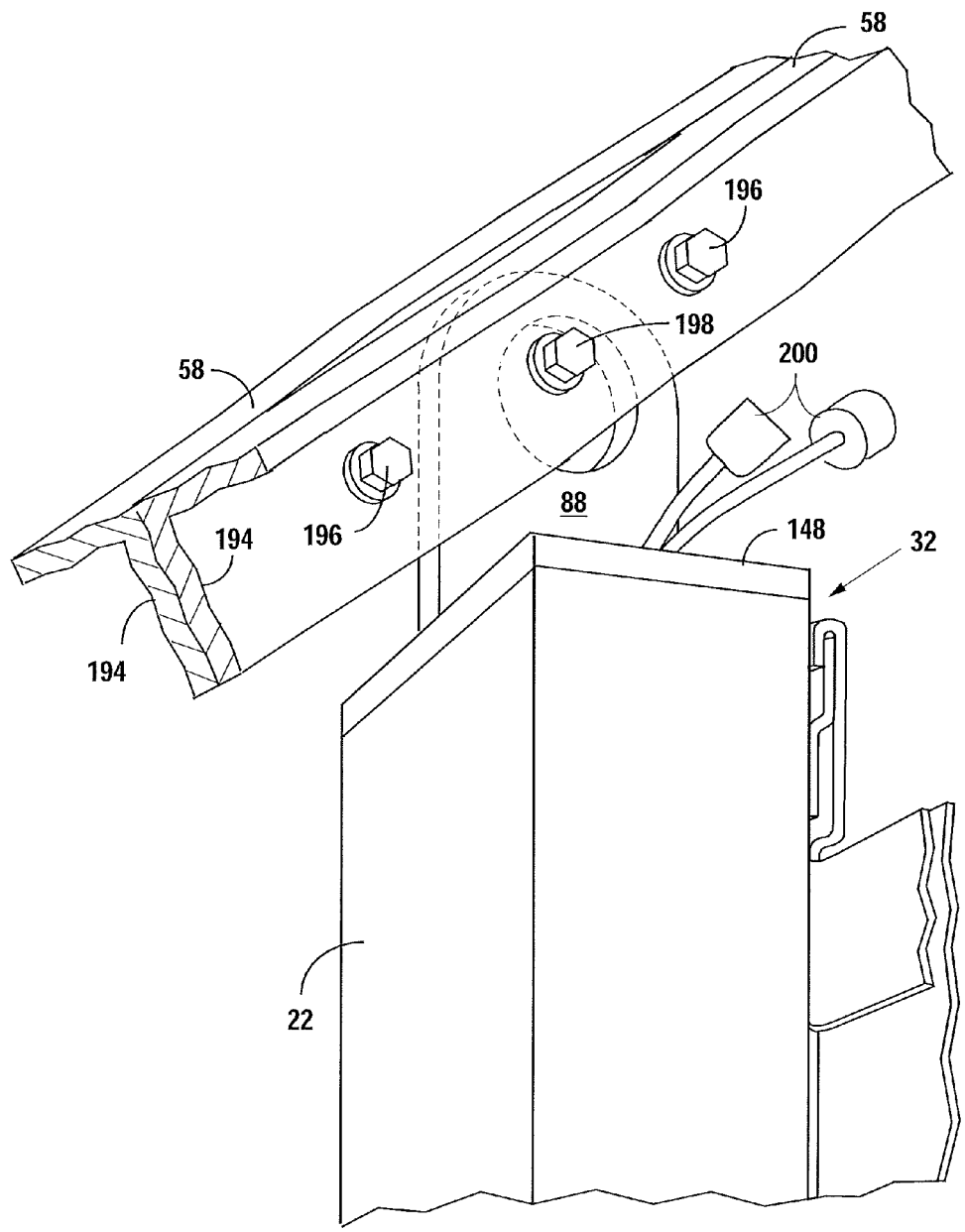
FIG. 9 is a perspective view of the eyelet at the second end of the pole and illustrates how a solar panel may be mounted to the eyelet.

FIG. 9 demonstrates how the solar panel 54 may be mounted at the second end 32 of the pole 22. The eyelet 88 is positioned between the two cross-members 58 that extend across the length of the frame 56. In this regard, each of the cross-members 58 has a vertical portion 194 positioned adjacent the eyelet 88 and two bolts 196 positioned outside the eyelet 88 pull the vertical portions 194 together to squeeze them around the eyelet 88. A third bolt 198 extends through the vertical portions 194 and through the eyelet 88 to help prevent the solar panel 54 from tilting and to further secure it. After the solar panel 54 is mounted, it may connect to one or more cables 200 extending through the endcap 148 from within the cavity in the pole 22.

Figure 10:
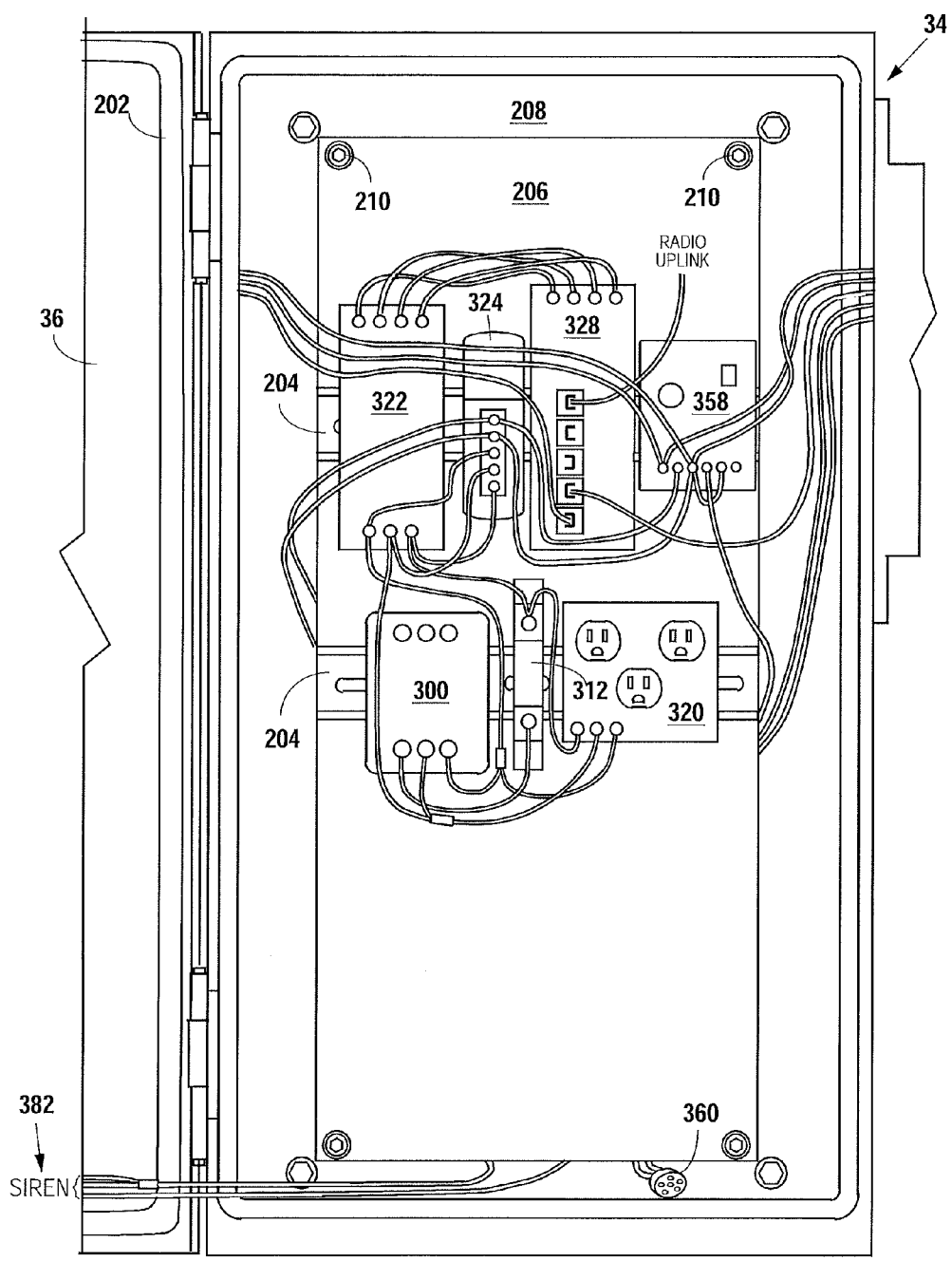
FIG. 10 is a front plan view of the housing with a door opened to illustrate the interior of the preferred housing and electrical components that may be within the housing.

In FIG. 10, the door 36 of the first housing 34 is open and reveals electrical components that may be present within its interior cavity. The interior cavity is preferably watertight, and a seal 202 around the perimeter of the door 36 helps achieve this goal. The first housing 34 may also be painted white to reduce the ambient temperature surrounding the electrical component within it.

The electric components within the interior cavity of the first housing may be mounted to one or more DIN rails 204 affixed to a plate 206, with the plate 206 mounted to an interior wall 208 of the first housing 34. The plate 206 may be affixed to the interior wall 208 using bolts 210 threaded into threaded cylinders (not shown) that are welded to the interior wall 208. The electrical components are mounted to the DIN rails 204 using DIN rail mounts (not shown) affixed to the back of each electrical component.

Figure 11:
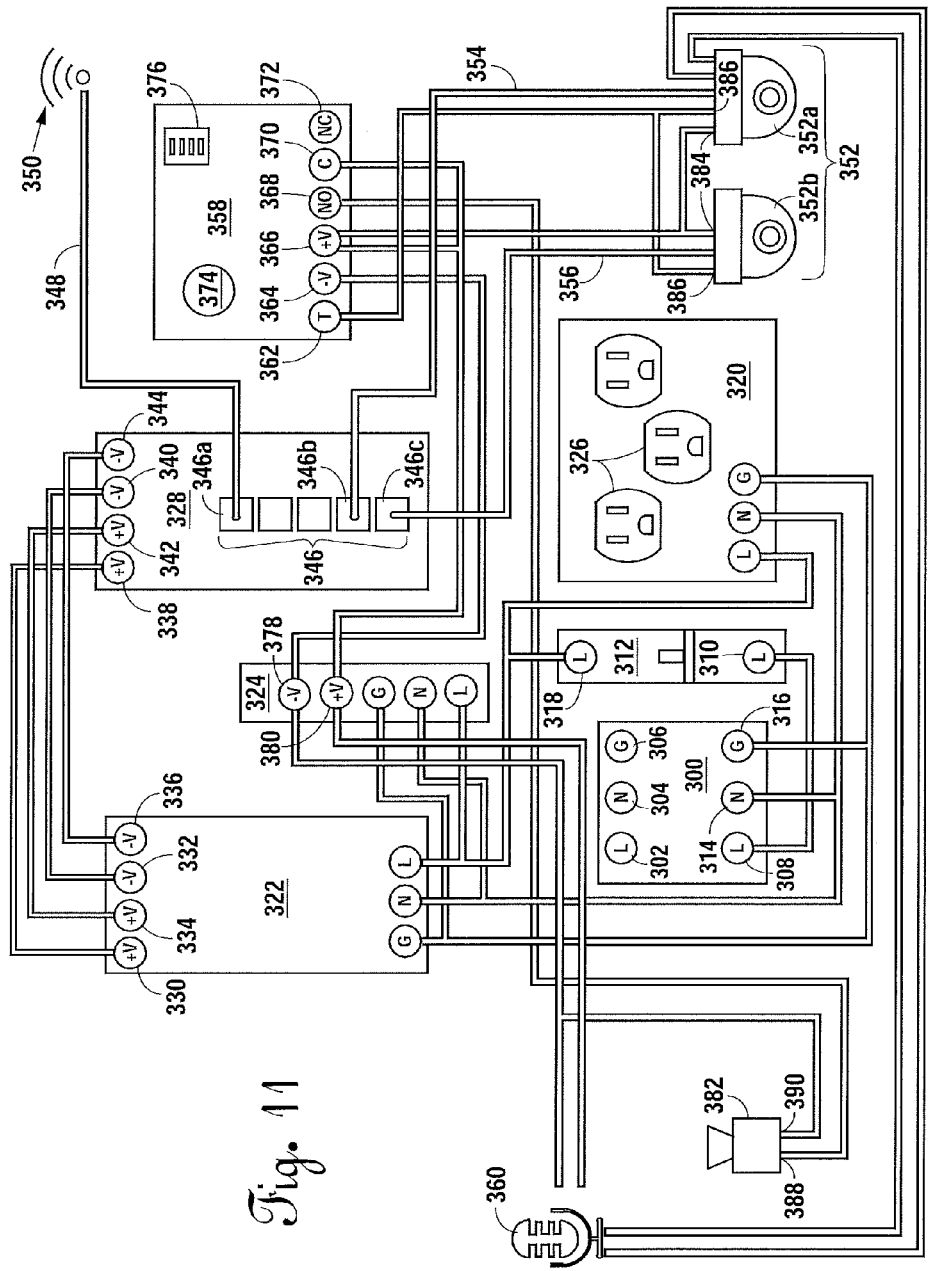
FIG. 11 is a schematic view of the electrical components from FIG. 10 that illustrates how the components are connected.

The specific electrical components in the interior cavity of the first housing 34 vary depending on the needs and design constraints of the monitored site, and the components illustrated in FIGS. 10 and 11 are designed for a monitored site where 120 volt alternating current (120 VAC) power is available. Incoming 120 VAC power is filtered through a power conditioner 300 to ensure the power delivered to the subsequent components is maintained at the proper voltage (e.g., 110 VAC). The incoming power is connected to a line input terminal 302, a neutral input terminal 304, and a ground input terminal 306 on the power conditioner 300. Power exits the power conditioner 300 through a line output terminal 308 that is connected to a line input terminal 310 of a circuit breaker 312. The power conditioner 300 also has a neutral output terminal 314 and a ground output terminal 316 connected to subsequent components discussed below.

The circuit breaker 312 is rated at the proper amperage (e.g., 15 amp circuit breaker) for the subsequent components. Power exits the circuit breaker 312 through a line output terminal 318 that is connected to a line input terminal (labeled "L" in FIG. 11) on a power distribution port 320, on a first power supply 322, and on a second power supply 324. The neutral output terminal 314 and the ground output terminal 316 of the power conditioner 300 are also connected to corresponding neutral input terminals (labeled "N" in FIG. 11) and corresponding ground input terminals (labeled "G" in FIG. 11) on the power distribution port 320, the first power supply 322, and the second power supply 324.

The power distribution port 320 has one or more electrical sockets 326 that provide AC power to any electrical devices (e.g., laptop, mobile phone charger, etc.) (not shown) that may be plugged into them.

The first power supply 322 provides direct current (DC) power to a Power over Ethernet (PoE) switch 328. Preferably the first power supply 322 is a redundant power supply having two or more power supply units within it. If so, one of the power supply units will provide power to the PoE switch 328 while the other remains inactive, but if the activated power supply unit fails the other power supply unit will activate. For example, a Mean Well DR-75-48 is one such power supply that provides redundant power, with 48 volt direct current (VDC) power available from each of the two power supply units.

As a redundant power supply, the first power supply 322 can provide power through a first positive terminal 330 and a first negative terminal 332, as well as through a second positive terminal 334 and a second negative terminal 336. The first positive terminal 330 is connected to a first positive terminal 338 on the PoE switch 328, the first negative terminal 332 is connected to a first negative terminal 340 on the PoE switch 328, the second positive terminal 334 is connected to a second positive terminal 342 on the PoE switch 328, and the second negative terminal 336 is connected to a second negative terminal 344 on the PoE switch 328.

The PoE switch 328 has two or more ports 346 for transmitting power and/or data communication over an Ethernet cable. One PoE switch 328 that has been effective for such an application is a Planet ISW-504PS PoE industrial switch by the Planet Technology Corporation, which has five ports total—four of which that can transmit power. One of the ports 346a (i.e., the non-power transmitting port) is an uplink port that is connected via a first Ethernet cable 348 to a communication device 350 (e.g., radio frequency receiver, wireless antenna, another network switch port, a modem, etc.) for transmitting data between the PoE switch 328 and a node (not shown) physically apart from the video monitoring device 20. For example, a wireless radio such as the Ubiquiti Networks NBE-M5-16 or a modem such as the CradlePoint IBR650 may be used as the communication device 350. The other ports provide power and communication to one or more PoE internet protocol (IP) cameras 352 via other Ethernet cables. For example, in the illustrated embodiment, one of the power-transmitting ports 346b is connected to a first PoE IP camera 352a via a second Ethernet cable 354 and another of the power-transmitting ports 346c is connected to a second PoE IP camera 352b via a third Ethernet cable 356.

The one or more PoE IP cameras 352 may be any standard outdoor-rated, smart series, IP camera, and a camera offered by Hikvision® having Model Number DS-2CD4332FWD-IZHS is an example of a suitable camera. The PoE IP cameras 352 are preferably connected to a timer relay switch 358 such as, for example, an Altronix® 6062 Multi-purpose timer. Additionally, a microphone 360 may be connected to one of the PoE IP cameras 352 through a microphone input line into the camera, as shown in FIG. 11.

The timer relay switch 358 is configured to send power to electronic components for a set duration after a triggering event occurs. In the illustrated embodiment it has a trigger input terminal 362, a negative terminal 364, a positive terminal 366, a normally open terminal 368, a common terminal 370, and a normally closed terminal 372. Additionally, the timer relay switch 358 may contain an adjustable trimpot 374 to adjust the duration over which the timer relay switch 358 will provide power after the triggering event occurs, and may contain one or more dip switches 376 to configure it for the particular application in which it is being used.

The second power supply 324 provides power to the timer relay switch 358, and a 12 volt DC power supply offered by Automation Direction under the name RHINO and having a model number PSB12-030-P is one example of a suitable power supply. The second power supply 324 provides power through a negative terminal 378 and a positive terminal 380. The negative terminal 378 is connected to the negative terminal 364 of the timer relay switch 358 and the positive terminal 380 is connected to the positive terminal 366 and the common terminal 370 of the power relay switch 358 in the illustrated embodiment.

Additionally, the second power supply 324 provides power to the microphone 360, with the positive terminal 380 and the negative terminal 378 each connected, respectively, to a corresponding positive terminal and a corresponding negative terminal on the microphone 360.

In the illustrated embodiment, the PoE IP cameras 352 communicate with the timer relay switch 358 to activate an audible alarm 382 (e.g., a siren) for a preset duration of time after a triggering event occurs. In this regard, the PoE IP cameras 352 have a digital circuit switch between an inbound side 384 of a digital output and an outbound side 386 of a digital output, and the path between the inbound side 384 and the outbound side 386 within the camera is normally open. The inbound side 384 is connected to the positive terminal 366 of the timer relay switch 358, and the outbound side 386 is connected to the trigger input terminal 362 of the timer relay switch 358. During operation, the inbound side 384 receives positive voltage from the positive terminal 366 of the timer relay switch 358, both before and after the triggering event occurs. Once the triggering event occurs, the path between the inbound side 384 and the outbound side 386 within the camera is closed, thereby allowing current to flow from the inbound side 384 of the digital output to the outbound side 386 of the digital output. The current is then transmitted to the trigger input terminal 362 of the timer relay switch 358.

The triggering event may be a variety of conditions detected by the PoE IP cameras 352 such as, for example, intrusion through a digital perimeter programmed into the PoE IP cameras 352. Additionally, closing the path between the digital input 384 and the digital output 386 may be achieved through an automated function programmed into the PoE IP cameras 352 or through a command (e.g., an application programming interface (API) command) sent to the PoE IP cameras 352 through the wireless communication device 350.

The timer relay switch 358 has a built-in "form C" relay involving the normally open terminal 368, the normally closed terminal 372, and the common terminal 370. In its non-activated state prior to the triggering event, there is a closed connection between the common terminal 370 and the normally closed terminal 372, allowing electric current to be transmitted from the normally closed terminal 372. At the same time, there is also an open connection between the normally open terminal 368 and the common terminal 370. After the triggering event, however, the current that flows into the trigger input terminal 362 causes a relay switch to close the normally open connection, thereby opening the normally closed connection. The normally open connection remains closed for the duration of time programmed into the timer relay switch 358 and electric current will flow through the normally open terminal 368 for that duration.

Components connected to the normally open terminal 368 will receive power from the timer relay switch 358 during the duration of time the normally open connection is closed. In this regard, the normally open terminal 368 of the timer relay switch 358 is connected to a positive terminal 388 on the audible alarm 382, and the negative terminal 378 of the second power supply 324 is connected to a negative terminal 390 on the audible alarm 382. Electric current thus flows from the normally open terminal 368 and through the audible alarm 382 while the normally open connection is closed, thereby activating the audible alarm 382 for the preset duration.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above description of the invention. It is therefore, contemplated that the appended claims will cover such modifications that fall within the scope of the invention.

I claim:

1. A video monitoring device for installation on a ground surface comprising:
   a concrete base having a first side with a first surface and a second side opposite said first side, said second side having a second surface designed to rest on the ground surface and a first indention within said second surface, said first indention extending in a substantially straight line;
   a plate mounted to the first surface;
   a pole with a first end at the plate and a second end opposite said first end, said pole extending in a generally upward direction from the plate;
   a first housing mounted to the pole; and
   at least one video camera mounted to the first housing.

2. The video monitoring device of claim 1 wherein the concrete base further comprises a second indention within the second surface, said second indention extending in a substantially straight line.

3. The video monitoring device of claim 2 wherein the first and second indention are substantially parallel.

4. The video monitoring device of claim 3 wherein the concrete base further comprises a third indention within the second surface, said third indention being located between the first indention and the second indention.

5. The video monitoring device of claim 3 wherein the concrete base further comprises a sidewall extending between the first side and the second side, and wherein the first indention and the second indention both extend through said sidewall.

6. The video monitoring device of claim 1 wherein the first surface is substantially planar.

7. The video monitoring device of claim 6 wherein the plate has a bottom surface that is substantially planar.

8. The video monitoring device of claim 1 further comprising
   a first bracket affixed to the pole, said first bracket having a lip protruding outwardly from said pole;
   a second bracket affixed to the first housing, said second bracket having a socket configured to receive the lip; and,
   wherein at least the first and second brackets mount the first housing to the pole.

9. The video monitoring device of claim 8 wherein the first housing has a rear surface adjacent the pole and the second bracket is affixed to said rear surface.

10. The video monitoring device of claim 8 wherein the lip is substantially straight.

11. The video monitoring device of claim 1 further comprising:
    a solar panel mounted to the second end of the pole; and,
    a second housing mounted to the pole.

12. The video monitoring device of claim 11 wherein the solar panel has a frame and said video monitoring device further comprises:
    an eyelet at the second end of the pole, said eyelet having a generally vertical portion;
    a first cross-member extending across the frame;
    a second cross-member extending across the frame substantially parallel to the first cross-member; and,
    wherein the vertical portion of the eyelet is between said first and second cross-members.

13. The video monitoring device of claim 1 wherein the pole is affixed to the plate.

14. A video monitoring device comprising:
    a concrete base having a first side with a first surface and a second side opposite said first side, said second side having a second surface designed to rest on the ground surface and a first indention within said second surface, said first indention extending in a substantially straight line;
a plate mounted to the first surface;
a pole with a first end at the plate and a second end opposite said first end, said pole extending in a generally upward direction from the plate;
a first housing mounted to the pole; and
at least one video camera mounted to the pole.

15. The video monitoring device of claim 14 wherein the concrete base further comprises a second indention within the second surface, said second indention extending in a substantially straight line.

16. The video monitoring device of claim 15 wherein the first and second indention are substantially parallel.

17. A video monitoring device comprising:
a concrete base having a first side with a first surface and a second side opposite said first side, said second side having a second surface designed to rest on the ground surface and a first indention within said second surface, said first indention extending in a substantially straight line;
a plate mounted to the first surface;
a pole with a first end at the plate and a second end opposite said first end, said pole extending in a generally upward direction from the plate; and,
at least one video camera mounted to the pole.

18. The video monitoring device of claim 17 wherein the concrete base further comprises a second indention within the second surface, said second indention extending in a substantially straight line.

19. The video monitoring device of claim 18 wherein the first and second indention are substantially parallel.

20. A video monitoring device for installation on a ground surface comprising:
a concrete base having a first side with a first surface and a second side opposite said first side, said second side having a second surface designed to rest on the ground surface;
a plate mounted to the first surface;
a pole with a first end at the plate and a second end opposite said first end, said pole extending in a generally upward direction from the plate;
a first housing mounted to the pole;
at least one video camera mounted to the first housing;
a first bracket affixed to the pole, said first bracket having a lip protruding outwardly from said pole;
a second bracket affixed to the first housing, said second bracket having a socket configured to receive the lip; and,
wherein at least the first and second brackets mount the first housing to the pole.

21. A video monitoring device comprising:
a concrete base having a first side with a first surface and a second side opposite said first side, said second side having a second surface designed to rest on the ground surface;
a plate mounted to the first surface;
a pole with a first end at the plate and a second end opposite said first end, said pole extending in a generally upward direction from the plate;
a first housing mounted to the pole;
at least one video camera mounted to the pole;
a first bracket affixed to the pole, said first bracket having a lip protruding outwardly from said pole;
a second bracket affixed to the first housing, said second bracket having a socket configured to receive the lip; and,
wherein at least the first and second brackets mount the first housing to the pole.

* * * * *